United States Patent [19]

Goldhorn et al.

[11] Patent Number: 4,646,344
[45] Date of Patent: Feb. 24, 1987

[54] MOBILE RADIO SET

[75] Inventors: Bruno Goldhorn, Keltern-Dietlingen; Rolf Stapelfeldt, Remchingen-Singen, both of Fed. Rep. of Germany

[73] Assignee: International Standard Electric Corporation, New York, N.Y.

[21] Appl. No.: 713,963

[22] Filed: Mar. 20, 1985

[30] Foreign Application Priority Data

Mar. 22, 1984 [DE] Fed. Rep. of Germany ....... 3410477

[51] Int. Cl.$^4$ ....................... H04M 11/00; H04Q 7/04
[52] U.S. Cl. ..................... 379/58; 379/433; 379/437; 379/445; 379/354
[58] Field of Search ................. 179/2 EA, 2 EB, 103, 179/158 R, 167, 29

[56] References Cited

U.S. PATENT DOCUMENTS 3,014,990 12/1961 Dicius ........................... 179/189 R
4,153,822 5/1979 Veda et al. ........................ 179/103

FOREIGN PATENT DOCUMENTS 0087788 9/1983 European Pat. Off. .
3015050 1/1981 Fed. Rep. of Germany .
3123596 1/1983 Fed. Rep. of Germany .

OTHER PUBLICATIONS

Fisher, R. E., "A Subscriber Set for the Equipment Test;" Bell System Tech. Journal, vol. 58, No. 1, (Jan. 1979), pp. 123-125.
Billström, Olle, et al, "Public Automatic Mobile Telephone System," Ericsson Review, vol. 57, No. 1, (1980), pp. 34-35.
Kahn, William J., "An Improved Mobile Telephone Control Unit", 27th Annual Conference, IEEE Vehicular Tech. Group, (3/77), pp. 168-172.

Primary Examiner—Gene Z. Rubinson
Assistant Examiner—Mark E. Ham
Attorney, Agent, or Firm—John T. O'Halloran; Thomas F. Meagher

[57] ABSTRACT

The mobile radio set has a rectangular parallelepiped-shaped case suitable for mounting in the dashboard of an automobile. The handset can be locked at its earpiece and mouthpiece into a cradle mounted on the front panel of the case so that the handset can be positioned in a rest position across the front panel. The keys, mounted on the side of the handset facing away from the cradle, are readable and operable in the rest position of the handset. With a lock mounted in the handset, the mobile radio set can be deenergized and the handset can be blocked in the cradle.

7 Claims, 2 Drawing Figures

MOBILE RADIO SET

BACKGROUND OF THE INVENTION

1. Field of the Invention

The present invention relates to a mobile radio set, particularly an automobile radiotelephone, comprising a handset cradle and a handset having an earpiece and a mouthpiece on one side and a keypad on the other, outer side.

2. Description of the Related Art

DE-AS 30 15 050 discloses a control device for a mobile radio set which is a telephone handset containing all electric and mechanical components of the telephone, such as keys for dialling, digital display, ringer, hookswitch, and master switch. The handset is composed of two half-shells one of which contains the receiver at one end, the transmitter at the other, and all components except keys and display, while the other, outer half contains the keyboard, the display, and further controls, such as the master switch for turning the mobile radio on and off. As the handset has a manually operable switch, it offers great freedom of movement. This freedom of movement is only limited by the length of the cord used to connect the handset with a receptacle of the radio unit. The cradle for the handset has no electric connections; it only serves to hold the handset in place when required. It is suitable for supporting the handset in a lying or hanging position.

A handset of similar design, i.e., with controls and indicators on the outside, is disclosed in DE-OS 31 23 596, which deals mainly with the user-friendly design of the keys and the depressions for the keys. To make it easier to feel for the keys, the depressions have different geometric shapes or different relief patterns.

It is also known to dispose the keypad for dialling and other control keys as well as the display in the front panel of a rectangular-parallelepiped-shaped case which can be inserted like a car radio into the dashboard of an automobile (European Patent Application 0 087 788). The case contains the electric components of the automobile radiotelephone is insertable into a built-in rack. Electric connections from the radiotelephone to the power supply and the transmitter circuit are made automatically by connectors when the unit is inserted.

SUMMARY OF THE INVENTION

The object of the invention is to provide a compact automobile radiotelephone which can be so mounted in an automobile as to be easily operable with one hand and as not to be in the way during other manipulations. An automobile radiotelephone mounted in the dashboard has proved to hamper the driver least; this particularly applies to the handset as the most prominent part. A special advantage of the invention lies in the fact that the handset is engageably held at the front panel in a transverse position but on edge, i.e., with the earpiece and the mouthpiece facing the front panel, because in this position it is integrated as far as possible. By contrast, conventional automobile radio telephones mounted on the center console are frequently in the immediate vicinity of the stick shift and/or the handbrake, so that the driver is hampered by the gearshift lever or the handbrake when reaching for the telephone. Since, in addition, each dashboard has a space for mounting a radio, the radio telephone can be mounted there without difficulty and in a compact manner. Controls and displays are close together and within the driver's field of view.

A noteworthy feature is the lock in the handset, with which the set can be made unusable. It can be used to deenergize the set and, if necessary, latch the handset in the support, so that it cannot be removed.

BRIEF DESCRIPTION OF THE DRAWING

The invention will now be described with the aid of two embodiments shown in the accompanying drawings, in which.

DESCRIPTION OF THE PREFERRED EMBODIMENTS

Figure 1:
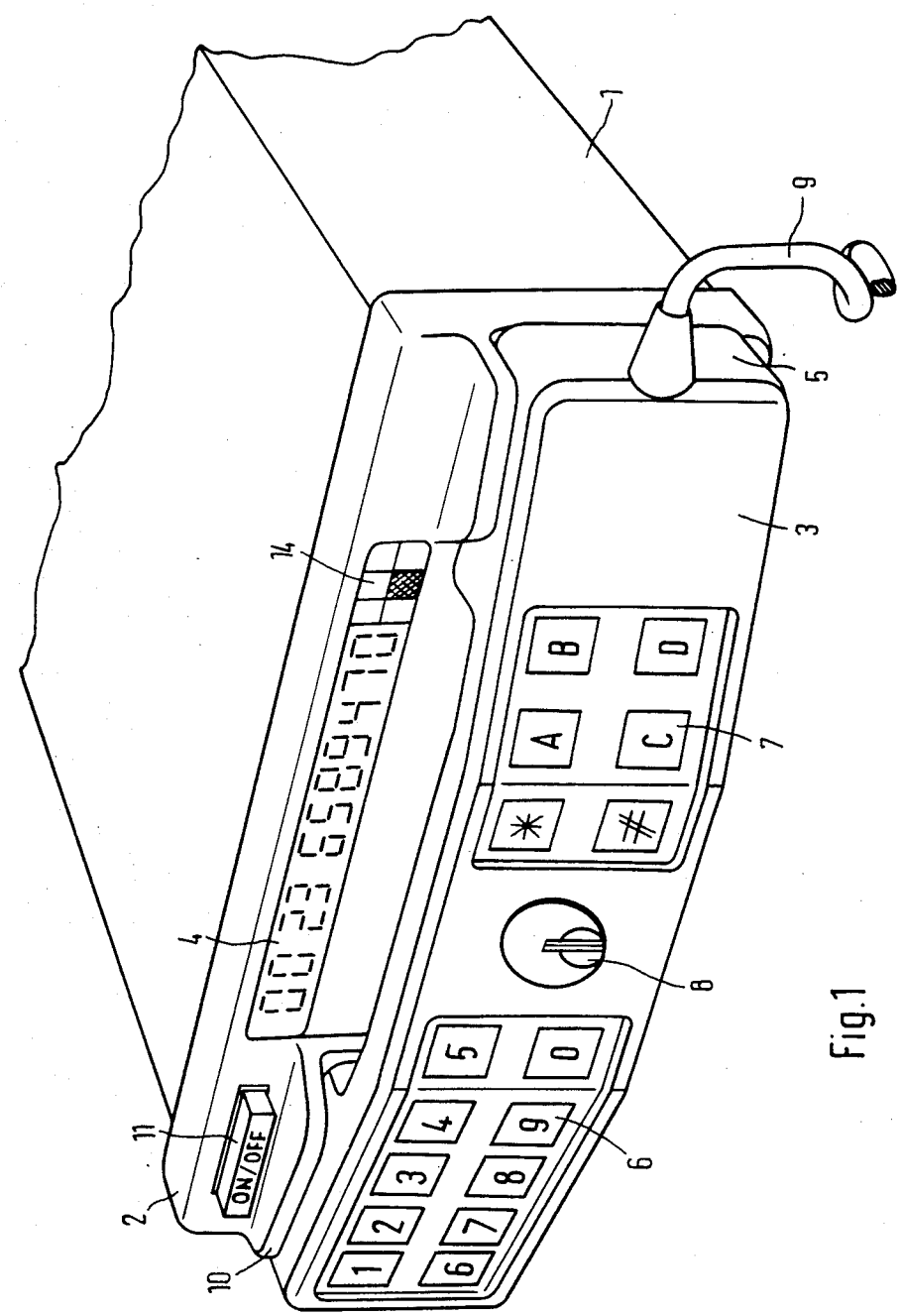
FIG. 1 is a perspective view of an automobile radiotelephone in accordance with the invention, with the handset locked in place.
Figure 2:
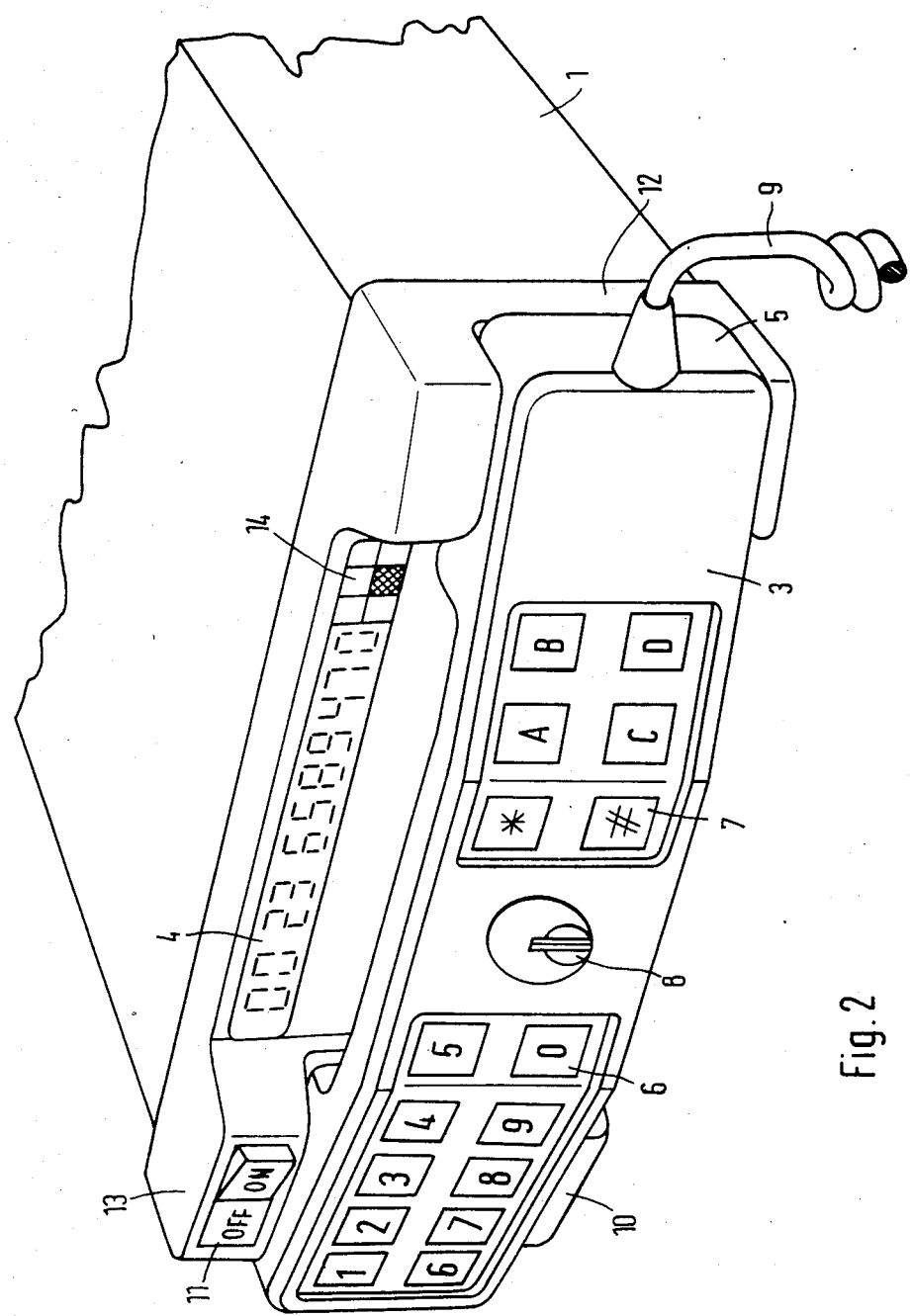
FIG. 2 is a perspective view of another embodiment of the automobile radiotelephone with a different front panel.

FIGS. 1 and 2 show two embodiments of the automobile radiotelephone in oblique front views. The rectangular-parallelepiped-shaped case 1 of the set is shown only in part. The front panel 2, 12 is rectangular and is provided with a cradle for the telephone handset 3 in its lower portion, while above the handset 3, i.e., in full view, a digital called-number display 4 and lamp indicators 14 are disposed. In FIGS. 1 and 2, like parts are designed by like reference characters. The case 1 corresponds in shape to that for a commercially available car radio suitable for mounting in the dashboard of an automobile. In similar fashion, the plan of the front panel 2, 12 corresponds to that of the front panel of such a car radio.

The handset 3 is similar to the handsets commonly used with stationary telephones but is especially narrow and flat. At its two pieces 5 containing the transmitter capsule and the receiver capsule, respectively, the handset is lockingly engageable with the front panel 2. On its other side, i.e., the outside, keys 6 for dialling and additional keys 7 are so arranged in two separate groups as to be readable when the handset is cradled, i.e., in the transverse position. Between the two groups of keys, in the center portion of the handset 3, there is a lock 8 with which the set can be locked up. This is done by mechanically latching the handset at the front panel 2, so that it cannot be removed, and/or by disconnecting the keys 6 and 7 to prevent a dialling process. An even better solution is to disconnect the power supply by means of the lock 8, thereby deenergizing the set. All main control functions are thus accommodated in the handset 3. The handset is electrically connected to the radiotelephone by the cable 9, which emerges from the end of the handset containing the transmitter and is capable of turning through 90°. Rarely needed controls (e.g., intensity of illumination of the displays, volume, etc.) can be disposed in the front panel 2 so as to be covered by the handset when the latter is cradled.

To guide the handset 3 into position during replacement, in the embodiment of FIG. 1, narrow ribs 10 are provided at the front panel 2 in the areas above and below the earpiece and the mouthpiece 5 of the handset. These areas also contain the locking members (not shown) for holding the handset in place. The master switch 11 is above the upper left-hand rib 10, and the dialled-number display 11 and the lamp indicators 14 are midway between the left-hand and right-hand ribs.

In the embodiment of FIG. 2, the upper ribs 13 are so wide as to occupy the remaining height of the front panel 12 above the handset 3. Here the master switch 11 is integrated in the left-hand rib 13.

The design of the front panel 2 and the handset 3 meets safety requirements imposed on automobiles. Call numbers are dialled with the handset locked in position; the same applies to the signalling of a call. To facilitate operation at night, the controls 6, 7, 11 and the display 4 are backlighted.

The design of the set also makes it possible to house the latter in a carrying case with integrated antenna, so that it can be used as a portable unit. In this instance, the power amplifier of the set will be replaced by a battery module.

We claim:

1. Mobile radio set, comprising a handset cradle and a handset having an earpiece and a mouthpiece on a side facing said handset cradle and a keypad on the other side facing away from said handset cradle, characterized in that the handset cradle (10, 13) is mounted across the front panel (2, 12) of a rectangular-parallelepiped-shaped case, said case housing a transmitter and a receiver and insertable into the dashboard of an automobile, and that the handset (3) comprises means at its earpiece and its mouthpiece (5) for locking said handset to the front panel so as to rest across the latter, and that the keys (6, 7) are readable and operable in this position of the handset (3), and further characterized in that a lock (8) with which the set can be locked up is fitted in the handset (3) with an end portion protruding into an opening of said handset on said side facing away from said cradle.

2. A mobile radio set as claimed in claim 1, characterized in that the handset cradle (10, 13) is formed by protuberant ribs which grasp at least part of the top and the underside of the handset (3) in the areas of the earpiece and the mouthpiece (5).

3. A mobile radio set as claimed in claim 2, characterized in that, adjacent the handset (3) in its resting position, at the top portion of the front panel (2, 12) contains a dialled-number display (4), lamp indicators (14), and a master switch (11).

4. A mobile radio set as claimed in claim 3, characterized in that the master switch (11) is contained in one of the ribs (13).

5. A mobile radio set as claimed in claim 1, characterized in that by means of the lock (8), the set can be disconnected from a power supply.

6. A mobile radio set as claimed in claim 1, characterized in that by means of the lock (8), the handset (3) is latched in the handset cradle (10, 13).

7. A mobile radio set as claimed in claim 1 characterized in that the front panel (2, 12) and the handset (3) are backlighted, and that the intensity of illumination is variable.

* * * * *